United States Patent [19]

Jansson

[11] 4,107,245
[45] Aug. 15, 1978

[54] METHOD OF AND COMPOSITION FOR MANUFACTURING AN OBJECT OF CROSS-LINKED POLYMER

[75] Inventor: Gunnar Jansson, Älvsjö, Sweden

[73] Assignee: Allmanna Svenska Elektriska Aktiebolaget, Vasteras, Sweden

[21] Appl. No.: 610,435

[22] Filed: Sep. 4, 1975

[30] Foreign Application Priority Data

Sep. 9, 1974 [SE] Sweden .............................. 7411327
Sep. 9, 1974 [SE] Sweden .............................. 7411328
Jun. 9, 1975 [SE] Sweden .............................. 75065318
Jun. 9, 1975 [SE] Sweden .............................. 7506532

[51] Int. Cl.² ............................................. C08K 5/00
[52] U.S. Cl. .................................. 264/40.1; 260/37 P; 260/42.21; 260/764; 264/78; 264/174; 264/236; 264/325; 264/328; 264/347
[58] Field of Search .................. 260/37 P, 42.21, 764; 264/40.1

[56] References Cited

U.S. PATENT DOCUMENTS

| 2,084,399 | 6/1937 | Kuettel ............................ 260/42.21 |
| 2,500,023 | 5/1950 | Burk ................................. 260/42.21 |
| 3,030,329 | 4/1962 | Warnsdorfer .................. 260/37 EP |
| 3,773,706 | 11/1973 | Dunn ................................. 260/37 N |
| 3,891,597 | 6/1975 | Needham ........................ 260/42.42 |
| 3,931,097 | 1/1976 | Fujio et al. ........................ 260/42.21 |

*Primary Examiner*—James H. Derrington
*Attorney, Agent, or Firm*—Watson, Cole, Grindle & Watson

[57] ABSTRACT

An object of cross-linked polymer, such as insulation for a cable conductor or a cable sheath, is formed by using a starting material containing a peroxide and a polymer material with the ability to undergo a cross-linking reaction in the presence of peroxide. The reaction is carried out during at least a part of the process in the presence of a substance which has the ability to undergo a color change during the cross-linking reaction of the polymer material so that a color change of the substance is obtained. There may also be added a dye which does not have the ability to undergo a color change during the cross-linking of the polymer material. The substance may be an aromatic compound containing at least one halogen atom and/or at least one heterocyclic ring in which ring there is at least one nitrogen atom to which no hydrogen atom is linked.

32 Claims, 8 Drawing Figures

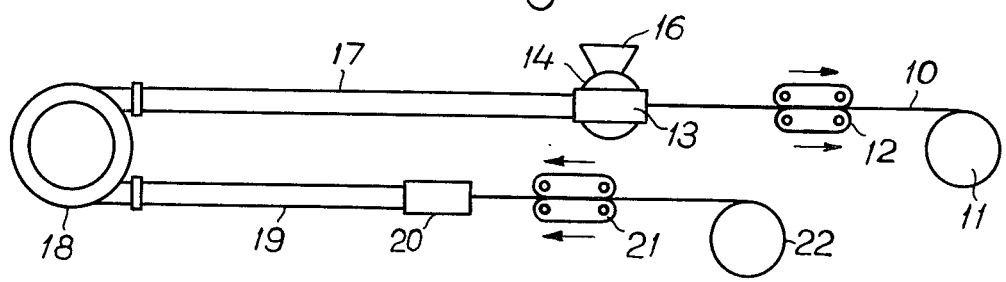
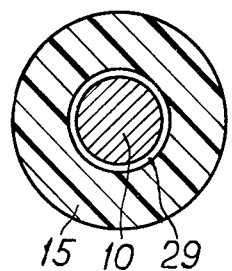 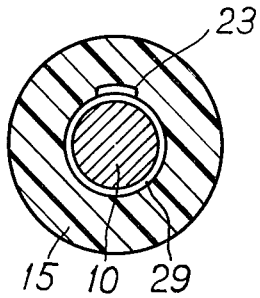 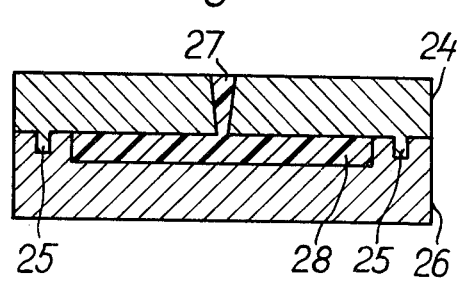
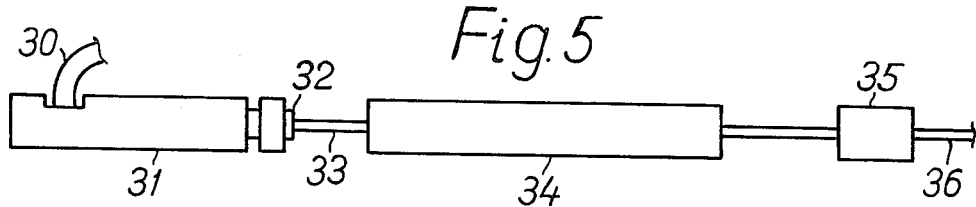
 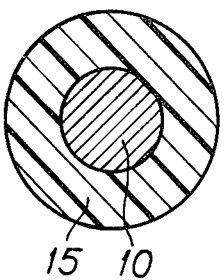 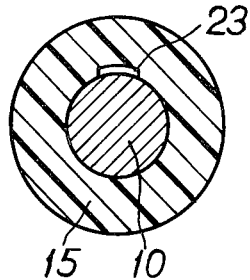

METHOD OF AND COMPOSITION FOR MANUFACTURING AN OBJECT OF CROSS-LINKED POLYMER

BACKGROUND OF THE INVENTION

Field of the Invention

The invention relates to a method of manufacturing an object of cross-linked polymer and to a composition for use in such a method.

SUMMARY OF THE INVENTION

In the manufacture of objects of cross-linked polymer, the conditions during the cross-linking reaction, that is, the temperature conditions and time, have an influence on the cross-linking which is obtainable in the degree of finished object. If a satisfactory degree of cross-linking is not achieved, the object formed must normally be scrapped. It is important that the degree of cross-linking be determined as early as possible in a manufacturing process, for example when manufacturing insulated cable conductors, so that the manufacturing process can be interrupted or the conditions of manufacture be adjusted if the degree of cross linking proves to be too low. In this way the amount of material produced which has to be scrapped is reduced to a minimum. For determining the degree of cross-linking it has hitherto been necessary to employ time-consuming and material-destroying test methods. Usually, an extraction method has been utilized. A sample of the object, for example a piece of an extruded insulation for a cable conductor, is then subjected to boiling in a solvent followed by vacuum drying. The total treatment time is of the order of approximately 24 hours. Since the manufacture goes on while the testing is being carried out, it involves a risk that the manufactured material must be scrapped, namely if the degree of cross linking proves to be too low. If the manufacture should be stopped, pending the result of the test in order to avoid manufacturing scrap material, this will naturally result in a loss of production.

According to the present invention, it has proved possible to determine the cross-linking degree in objects of polymer cross-linked with peroxide in a very simple and quick manner. Determining the degree of cross linking is normally possible without destroying the material produced. Because of the quickness of the determination, the conditions of manufacture can be quickly adjusted, which means that the manufacture of an object, for example an extruded cable insulation, can take place under optimum conditions, that is, without using great safety margins as far as time and temperature are concerned.

More particularly, the present invention relates to a method of manufacturing an object of cross-linked polymer while using a peroxide, characterized in that a starting material containing a peroxide and a polymer material with the ability to undergo a cross-linking reaction in the presence of the peroxide is formed into an object and is cross-linked at least during some part of the manufacturing process in the presence of a substance with the ability to undergo a color change during the cross-linking reaction of the polymer material, so that a color change of the substance is achieved. According to the invention, the degree of cross linking can be determined visually. To facilitate the reading of this specification, the substance with the ability of undergoing a color change during the cross-linking reaction of the polymer material is hereafter referred to in the description as the cross-linking indicator. When the invention is utilized to its optimum, the cross-linking indicator is present all the time during the forming and the cross-linking reaction. In continuous processes, for example, it is of course possible to add the cross-linking indicator only temporarily, for example during a running-in period to ensure that the proper manufacturing conditions are used, and in other respects to perform the manufacture without the addition of the indicator.

A probable explanation of the effect obtained according to the invention is that the cross-linking indicator cooperates with free radicals which are formed when the peroxide is split, at the same time forming an intermediary radical which gives rise to a residual product of the cross-linking indicator with another color than the indicator itself without any free radicals being consumed for the cross-linking of the polymer. The electric and mechanical properties of the cross-linked polymer will be at least as good as when no cross-linking indicator is used. In some cases an improvement of these properties is obtained instead, which indicates that the presence of the indicator accelerates the formation of cross-links.

For curable compositions in the form of epoxy, epoxy phenoxy and polyurethane systems and polymeric drying oils in the form of copolymerisates of conjugated diolefins, for example butadiene and unsaturated monomers, for example styrene, which are liquid and dissolved in solvents and which are used as protective coatings and as binders, it is known to control the curing with materials which undergo a color change during the curing of the resins.

The color change of the cross-linking indicator may, for example, consist in a change of the color, for example from violet to colorless or in a change of the color strength or the tint, for example from a stronger violet color to a lighter violet color.

When applying the method according to the invention it is suitable to calibrate the color transformation of the cross-linking indicator at different degrees of cross-linking against determinations of the degree of cross-linking according to previously used methods for such determinations, for example the extraction method.

The present invention also relates to a composition capable of being cross-linked which contains a peroxide and a polymer material with the ability to undergo a cross-linking reaction in the presence of the peroxide, characterized in that the composition further contains a substance with the ability to undergo a color change during the cross-linking reaction of the polymer material. The composition is intended to be used when carrying out the method according to the present invention.

According to one embodiment of the invention, the cross-linking indicator can be distributed substantially uniformly in the starting material of peroxide and polymer material prior to forming. The amount of cross-linking indicator may vary within wide limits depending on the type of polymer material, type and amount of peroxide, and above all depending on the type of cross-linking indicator. However, the quantity is within the range of from 0.0005 to 5 parts by weight per 100 parts by weight of polymer material. Preferably, the amount of cross-linking indicator is from 0.005–0.5 parts by weight per 100 parts by weight of polymer material.

According to another embodiment of the invention, the cross-linking indicator is applied in locally limited areas in the starting material prior to or in connection with the forming of the object, for example as a string, a wire, a strip or as discrete granulates placed at distances from each other. In this connection, it is suitable to incorporate the cross-linking indicator in a suitable polymer material to form a preformed product which is used during the forming. In the exemplified cases, the preformed product has the form of a string, a wire, a strip or a granulate. The polymer material in the preformed product may suitably be of the same kind as the polymer material in the starting material for the object, for example polyethylene in both products, but need not be of the same kind. For example, the polymer material in the preformed product may consist of a copolymerizate of ethylene and propene with dicyclopentadiene, whereas the polymer material in the starting material for the object may be polyethylene, chlorosulphonated polyethylene or polypropene. The preformed product may, but need not, be supplied with peroxide. The content of cross-linking indicator in the preformed product amounts to 0.0005 to 5 parts by weight and preferably to 0.005–0.5 parts by weight per 100 parts by weight of polymer material in the preformed product, if the preformed product is locally identifiable in the main product. On the other hand, if the cross-linking indicator during the forming of the starting material is dispersed in the starting material in its entirety, higher contents of cross-linking indicator may be used in the preformed product.

According to one further embodiment of the invention, the starting material or the preformed product mentioned in the preceding paragraph is supplied, in addition to the cross-linking indicator, with a dye without the ability to undergo a color change during the cross-linking reaction of the polymer material. It is possible, for example, to supply a cross-linking indicator which changes from red to colorless during the cross-linking together with a yellow dye which does not change color during the reaction. Prior to the cross-linking of the starting material in the process, the starting material and the preformed product, respectively, are orange in color, whereas the color after the cross-linking is yellow. The content of dye without the ability to undergo a color change suitably amounts to 0.0005 to 5 parts by weight per 100 parts by weight polymer material in the starting material, if this coloring agent is evenly distributed in the starting material, and per 100 parts by weight polymer material in a preformed product, respectively, which is applied in locally limited areas in the starting material.

Examples of suitable cross-linking indicators are aromatic compounds containing at least one halogen atom and/or at least one heterocyclic ring which comprises at least one nitrogen atom to which no hydrogen atom is linked. Such cross-linking indicators are the following, which contain a benzene ring with at least one halogen atom directly linked to it, and/or which contain a heterocyclic 5- or 6-ring, in which there is at least one nitrogen atom to which no hydrogen atom is linked: (benzene rings are marked

)

carbazole dioxazine violet (violet, transformation to colourless in, e.g., polyethylene, and in a copolymerisate of ethylene, propylene and dicyclopentadiene)

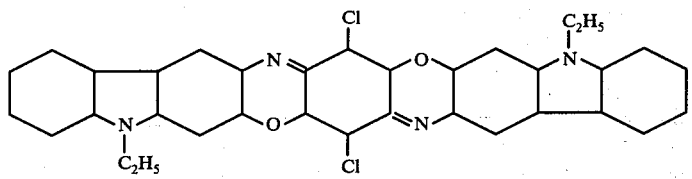

(e.g. with the trade name PV Fast Violet BL from Hoechst, Casella)

a thioindigo-Bordeaux (red, transformation to colourless in, e.g. polyethylene and in a copolymerisate of ethylene, propylene and dicyclopentadiene)

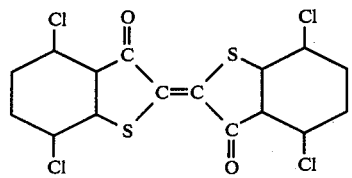

(e.g. with the trade name Bordeaux RN Pigment Red 88 from Ciba-Geigy)

a compound with the following formula (red violet, transformation to colorless in, e.g., polyethylene, and in a copolymerisate of ethylene, propylene and dicyclopentadiene):

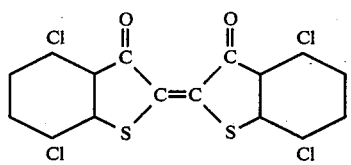

(e.g. with trade name PV Red Violet MR from Hoechst, Casella)

a compound with the following formula (yellow, transformation to lighter yellow in, e.g., polyethylene, and in a copolymerisate of ethylene, propylene and dicyclopentadiene):

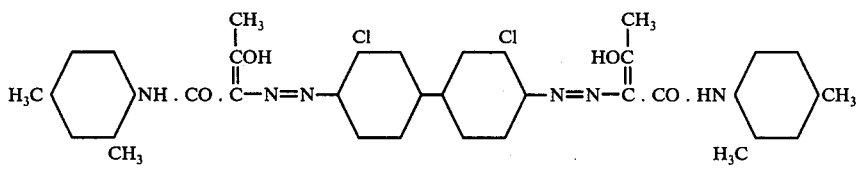

(e.g. with the trade name PV Gelb GR from Hoechst, Casella), a compound with the following formula (red, transformation to yellow in, e.g., polyethylene and in a copolymerisate of ethylene, propylene and dicyclopentadiene):

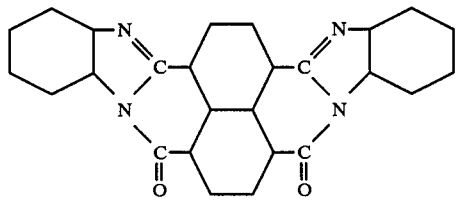

(e.g. with the trade name Permanentrot TG 01 from Hoechst, Casella), a compound with the following formula (red, transformation to yellow in, e.g., polyethylene, and in a copolymerisate of ethylene, propylene and dicyclopentadiene)

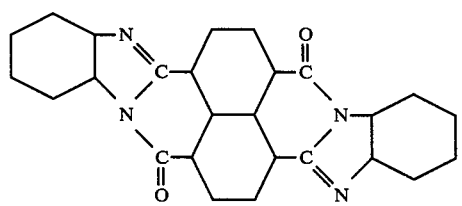

(e.g. with the trade name PV-Echt-Orange GRL from Hoechst, Casella)

a compound with the following formula (reddish-brown, transformation to light brown in, e.g., polyethylene and in a copolymerisate of ethylene, propylene and dicyclopentadiene):

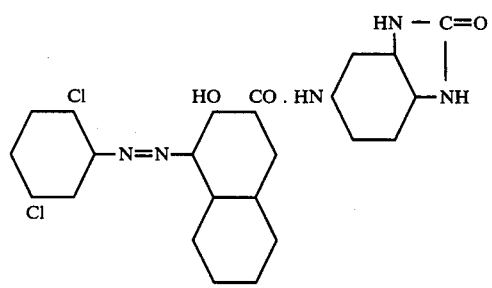

(e.g. with the trade name PV-Echt-Braun HFR from Hoechst, Casella), a compound with the following formula (yellow, transformation to light yellow in, e.g., polyethylene, and in a copolymerisate of ethylene, propylene and dicyclopentadiene):

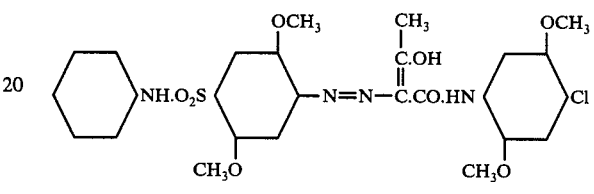

(e.g. with the trade name Permanentgelb FGL from Hoechst, Casella), a compound with the following formula (yellow, transformation to light yellow in, e.g., polyethylene and in a copolymerisate of ethylene, propylene and dicyclopentadiene):

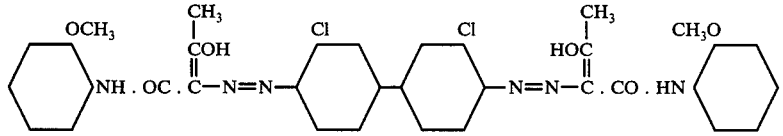

(e.g. with the trade name PV-Gelb GG from Hoechst, Casella)

a compound with the following formula (yellow, transformation to lighter yellow in, e.g., polyethylene and in a copolymerisate of ethylene propylene and dicyclopentadiene):

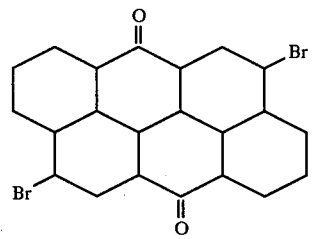

(e.g. Hostaperm scharlach GO from Hoechst, Casella).

Among the cross-linking indicators mentioned above, the first six are particularly preferred because of the very clear color transformations obtained with these. In the four first-mentioned indicators containing a halogen atom, the halogen atom is a chlorine atom.

Some of the cross-linking indicators exemplified above have been found to improve markedly the dielectric strength of the cross-linked, formed product.

Examples of appropriate dyes without ability to undergo a color change during the cross-linking reaction are titanium dioxide, amino anthraquinonone violet

(e.g. with the trade name Chinacridon-Violet from Ciba-Geigy)
and copper phtalocyanine

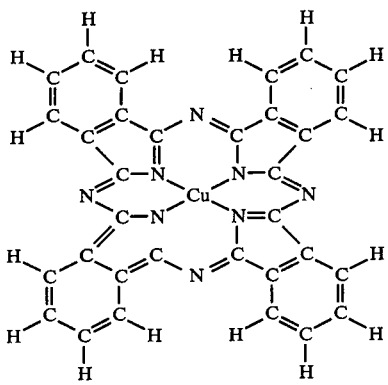

(e.g. with the trade name Kupferphthalocyanin from Ciba-Geigy)

As examples of substances which contain both cross-linking indicators and dyes without the ability to undergo color change during the cross-linking reaction of the polymer material may be mentioned PZ 153 Orange 24 (from Bakelite Xylonite Limited, transformation from orange to yellow), PZ 157 Violet 29 (from Bakelite Xylonite Limited, transformation from violet to greyish white) and PZ 100 Violet 1 (from Bakelite Xylonite Limited, transformation from violet to greyish white).

As examples of polymer materials which may undergo cross-linking while using peroxide and which may be used when carrying out the method according to the invention and be included in the composition according to the invention may be mentioned polyethylene, copolymerisate of ethylene and propylene, copolymerisate of ethylene or propylene or ethylene and propylene with dienmonomers such as 1,4-pentadiene, 1,4-hexadiene, 5-alkenyl-2-norbornene, 2,5-norbornadiene, 1,5-cyclooctadiene and dicyclopentadiene, which copolymerisates have double bonds remaining from the dienmonomer molecules, ethylene-propylene-ter-polymer, copolymerisate of ethylene and vinylacetate, copolymerisate of ethylene and ethylacrylate, sulfochlorinated polyethylene, chlorinated polyethylene polysulphide, polyurethane, silicon rubber, butadiene-acrylonitrile rubber, butadiene-styrene rubber, polychloroprene, butadiene rubber, isoprene-rubber and crude rubber.

As examples of applicable peroxides there may be mentioned organic peroxides such as di-α-cumyl peroxide, di-tert.-butyl peroxide, di-(tert.-butylperoxiisopropyl)benzene, di-(tert.butylperoxi)trimethylcyclohexane, dimethyl-di (tert.butylperoxi)hexane, bensoyl peroxide, dimethyl-di(peroxibensoate), tert.-butyl peracetate, N-butyl-bis(tert.butylperoxi)valerate, tert.-butylperbensoate, dimethyl-di(tert.butylperoxi)hexyn, di-chlorobensoyl peroxide, cumene hydroperoxide, tert.-butylcumyl peroxide, di-tert.butyl peroxide and butane carboxylic acid-n-butyl ester. The amount of peroxide is suitably from 0.1 to 5 parts by weight per 100 parts by weight of total polymer material. The expression total polymer material refers to the polymer material which is present in the starting material as well as in any preformed product used.

Temperature and time for the cross-linking reaction vary with the type of polymer material used in the starting mixture, the type and amount of peroxide used, the size and shape of the object and the heating method for the cross-linking reaction. In many applications the temperature lies around 150°-200° C. The time at such a temperature is strongly dependent on the thickness of the material of the object. When, for example, the thickness of the material is around 1-2 mm, the time can be around 1-30 minutes in many cases.

The starting material for the method according to the invention and the composition according to the invention, respectively, may, but need not, contain a filler in a conventional manner (suitably 1-400 parts by weight per 100 parts by weight of total polymer material), for example chalk, kaolin, plasticizer (suitably 1-75 parts by weight per 100 parts by weight of total polymer material), for example dioctyl phthalate, aromatic or paraffin-based oils, activators for the peroxides (suitably 0.3-3 parts by weight per 100 parts by weight of total polymer material), for example triallyl cyanurate, ethylene glycol-dimethacrylate and metal oxides such as lead oxide or magnesium oxide (suitably 1-50 parts by weight per 100 parts by weight of total polymer material), antioxidants (suitably 0.5-5 parts by weight per 100 parts by weight of total polymer material), for example polymerised trimethyl dihydroquinoline, aldol-α-naftylamine, flame retardents (suitably 1-60 parts by weight per 100 parts by weight of total polymer material), for example antimony trioxide and halogenated hydrocarbons and other conventional additives.

Among the forming methods which may be used may be particularly mentioned extrusion, and further injection moulding and compression moulding.

BRIEF DESCRIPTION OF THE DRAWINGS

The invention will be explained in more detail by way of examples with reference to the accompanying drawing, in which FIG. 1 schematically shows a device for carrying out the method according to the invention in the case of extrusion of an insulated cable conductor, FIGS. 2 and 3 cross-sections of an insulated cable conductors manufactured in a device according to FIG. 1, FIG. 4 schematically a device for performing the method according to the invention in the case of injection moulding, FIG. 5 schematically a device for performing the method according to the invention in the case of extrusion of a profile, FIG. 6 a cross-section of the profile manufactured in a device according to FIG 5, and FIGS. 7 and 8 cross-sections of other insulated cable conductors than those in FIGS. 2 and 3, manufactured in a device according to FIG. 1.

DESCRIPTION OF THE PREFERRED EMBODIMENTS

EXAMPLE 1

The following components are mixed into a homogeneous compound and granulated in an extrusion machine with a granulating nozzle:

| | |
|---|---|
| 100 parts by weight | LD polyethylene with melting index 0.2–20 |
| 2 parts by weight | di-α-cumyl peroxide (such as Di-Cup R from Hercules Powder, USA) |
| 0.01 parts by weight | carbazole dioxazine violet (cross-linking indicator, such as PV Fast Violet BL from Hoechst, Casella) |
| 0.2 parts by weight | polymerised trimethyl dihydroquinoline (antioxidant, such as Flectol from Freeport, USA) |

Instead of adding the cross-linking indicator as such, it may be added, for example, in the form of a masterbatch in granulate form consisting of 99 percent by weight of LD-polyethylene and 1 percent by weight of cross-linking indicator. In that case 1 part of the masterbatch is added.

The manufacture of an insulated cable conductor using the compound described above may be performed in the following way with reference to FIG. 1. The conductor 10, in the exemplified case consisting of aluminium having a cross-sectional area of 120 mm$^2$, is rolled off from a drum 11 with the help of the roll-off device 12 in the form of two endless transport belts and is thereafter provided in a conventional manner with an approximately 0.5 mm thick semiconducting layer 29 (FIG. 2) in a device (not shown). Thereafter the conductor passes through the cross head 13 on an extrusion machine 14. The conductor is then surrounded with a 3.5 mm thick insulation 15 (FIG. 2) of the compound. The compound is charged in the form of granulate in the filling funnel 16 of the extrusion machine. The temperature in the extrusion machine is suitably maintained at about 120° C. The insulation is cross-linked by heating the insulated conductor in water steam with a temperature of 215° C in the tube 17. The time during which the insulated conductor passes the tube 17 is about 5–10 minutes. From the steam tube the insulated cable conductor is passed via a turning wheel 18 to a cooling tube 19, where it is pressure-cooled with water which is at room temperature. The insulated conductor then passes, in turn, a waterseal 20 and a roll off device 21 in the form of two endless transport belts before it is coiled up on the drum 22. The roll-off devices 12 and 21 cooperate so that the conductor is held stretched during the process.

The degree of cross-linking in the polyethylene can be determined and controlled visually or by an instrument somewhere after the passage of the water-seal 20 by observing the color of the insulation and comparing it with a scale of the same cross-linking indicator in the same polymer material and the same concentration as in the compound used, which has been calibrated to known degrees of cross-linking, for example by the extraction method. For the cross-linking indicator used here, such a scale proceeds from a field with a relatively strong violet color, corresponding to the color of the compound prior to the cross-linking, via a field with a violet color with a successively decreasing strength to a field without color, which fields in this stated order correspond to an increasing degree of cross-linking. If the insulation is completely decolored, the degree of cross-linking is at least 75%, which is satisfactory. If the color corresponds to too low a degree of cross-linking, it can be increased by increasing the time during which the insulation is in the tube 17 and/or by increasing the temperature in this. Such an adjustment of the conditions may be performed with advantage by means of an instrument which records the color of the insulation somewhere after its passage of the water-seal 20 and which then controls the temperature in the tube 17 or the speed of the conductor 10.

An alternative way of determining the degree of cross-linking in the device according to FIG. 1 is the following. In the device according to FIG. 1 a preformed product in the form of a strip of polyethylene containing cross-linking indicator may be fed in along the conductor when this enters into the extrusion machine. This can be done by attaching the strip by an adhering tape to the semiconducting layer before the conductor enters the cross head 13. The raw material for the insulation around the conductor contains no cross-linking indicator, but otherwise it has the same composition as that given in the introductory part of Example 1. The tape has the same composition as the last-mentioned compound, however possibly without peroxide and anti-oxidant. Manufacture of the insulated conductor is performed in the same way as has been described before. In order to determine the degree of cross-linking of the finished insulated conductor, a cross-section thereof is cut out, shown in FIG. 3, where the strip with the cross-linking indicator is designated 23. The color of the cross-linking indicator is then compared with a calibrated scale, and thereafter the necessary measures are taken for controlling the cross-linking reaction in the conductor insulation.

EXAMPLE 2

The following components are mixed and kneaded or rolled together into a homogeneous compound:

| | |
|---|---|
| 100 parts by weight | consisting of a copolymerisate of ethylene, propylene and dicyclopentadiene with double links remaining from the last-mentioned compound (such as Vistalon 2504 from Esso Chemical, USA) |
| 100 parts by weight | kaolin (filler, such as Translink 37 from Freeport, USA) |
| 100 parts by weight | chalk (filler, such as Vinnofil S from ICI, England) |
| 45 parts by weight | low-aromatic paraffin-based oil (plasticizer, such as Sunpar 150 from Sunoco, USA) |
| 5 parts by weight | zinc oxide |
| 1 part by weight | polymerized trimethyl dihydro quinoline (antioxidant such as Flectol from Freeport) |
| 0.2 parts by weight | thioindigo-Bordeaux (cross-linking indicator, such as Bordeaux RN Pigment Red 88 from Ciba-Geigy). |

When a homogeneous compound has been obtained from these components, the following components are mixed in by kneading or rolling:

| | |
|---|---|
| 2.8 parts by weight | di-α-cumyl peroxide (such as Di-Cup R from Hercules Powder) |
| 0.8 parts by weight | triallyl cyanurate (such as Aktivator OC from Degussa, Germany). |

The compound is used in strip form. Manufacture of an insulated cable conductor may be performed with the device shown in FIG. 1, in which, however, the filling funnel 16 has been replaced by a strip feeding equipment suitable for rubber strips. The conductor 10 may then consist of tin-plated copper with a cross-sectional area of 2.5 mm² which is coated with an insulation 15 with a thickness of 0.8 mm. The temperature in the extrusion machine 14 may be 90° C. The temperature in the steam tube is, as before, 215° C and the time for the conductor to pass the steam tube 0.2–1 minutes. In other respects, the conditions may be the same as have been described for the manufacture of the insulated conductor according to Example 1.

The color change of the cross-linking indicator is from red violet via an increasingly reduced red violet color to colourless as the degree of cross-linking successively increases. To establish the degree of cross-linking, the color is compared with a calibrated scale of the same cross-linking indicator in the same starting material, and thereafter any measures which may be necessary for controlling the cross-linking reaction in the insulating casing of the conductor are taken.

EXAMPLE 3

The same starting material as the extrusion machine is charged with in the case according to Example 1 is used for manufacturing an injection-moulded part of the tool in FIG. 4. The tool which is shown in cross-section consists of an upper tool half 24 with guide pins 25 and a lower tool half 26 which are held pressed against each other during the moulding. The upper tool half is provided with an ingot 27 for injection through an injection moulding equipment (not shown) of the starting material in the cylindrical cavity 28. The cross-linking reaction is carried out, for example, at 200° C for a time of 10 minutes at a pressure of 50 atmospheres. As in the cases described previously, the degree of cross-linking is established by comparison with a calibrated scale of the same cross-linking indicator, after which the conditions of manufacture are possibly adjusted so that the desired cross-linking degree is obtained.

EXAMPLE 4

The following components are mixed and kneaded or rolled together into a homogeneous compound:

| | |
|---|---|
| 78 parts by weight | polychloroprene (such as Neopren TW from Du Pont USA) |
| 22 parts by weight | styrene-butadiene rubber (such as Solpren 1205 from Phillips petroleum; Holland) |
| 63 parts by weight | kaolin (filler, such as M100 from English China Clay, England) |
| 4 parts by weight | magnesium oxide |
| 22 parts by weight | butyloleate (plasticizer, such as Butyloleat from Unilever-Emery, USA) |
| 3 parts by weight | paraffin (lubricant) |
| 5 parts by weight | stearine (lubricant) |
| 1 part by weight | octamin (antioxidant, such as Octamin from Rubber Regenerating, USA) |
| 0.07 parts by weight | thioindigo-Bordeaux (cross-linking indicator, such as Bordeaux RN Pigment Red 88 from Ciba-Geigy). |

When a homogenous compound has been obtained from these components, the following components are mixed in by kneading or rolling:

| | |
|---|---|
| 8 parts by weight | lead oxide |
| 1 part by weight | di-α-cumyl peroxide (such as Di-Cup R from Hercules, Powder). |

The compound obtained may be used, among other things, for extrusion of a profile in the device shown in FIG. 5. The compound 30, suitably in strip form, is supplied to an extrusion machine 31 which is provided with suitable strip feeding equipment and with a nozzle 32 for achieving the desired profile 33, whose cross-section is shown in FIG. 6. The temperature in the extrusion machine may be 90° C. The formed profile is cross-linked by heating in a cross-linking equipment 34, for example a microwave furnace. Suitable conditions for the cross-linking reaction are 200° C for 20 minutes. After the cross,linking, the product is subjected to a cooling in a cooling equipment 35, for example a water bath. The finished cross-linked product is designated 36.

In this case, the transformation of the cross-linking indicator is from red violet to dark brown, with shades lying therebetween, as the cross-linking degree is successively increased. As in cases described earlier, the cross-linking degree is established by comparing with a calibrated scale of the same cross-linking indicator, after which any adjustment of the conditions of manufacture are made so that the desired degree of cross-linking is obtained. The profile produced may be used, for example, as a fillister.

EXAMPLE 5

The following components are mixed into a homogeneous compound and granulated in an extrusion machine with a granulating nozzle:

| | |
|---|---|
| 100 parts by weight | LD-polyethylene with the melting index 0.2 – 20 |
| 2 parts by weight | di-α-cumyl peroxide (such as Di-Cup R from Hercules Powder, USA) |
| 0.005 parts by weight | cross-linking indicator (such as PV Red Violet MR from Hoechst, Casella), formula |

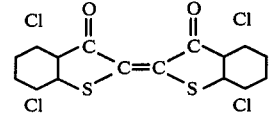

| | |
|---|---|
| 0.2 parts by weight | polymerized trimethyl dihydro quinoline (antioxidant such as Flectol from Freeport, USA). |

Instead of adding the cross-linking indicator as such, it may, among other things, be added in the form of a masterbatch in granulate form consisting of 99 parts by weight LD-polyethyene and 1 percent by weight cross-linking indicator. In this case 0.5 parts by weight of the masterbatch is added.

Manufacture of an insulated cable conductor, using the compound described above, may be carried out in the device according to FIG. 1 in the manner described in Example 1. In this case, however, the conductor of aluminium has a cross-sectional area of 2.5 mm$^2$, and the conductor is directly surrounded (i.e. no semiconducting layer is applied) by a 0.8 mm thick insulation 15 (FIG. 7) of the compound. The insulation is cross-linked under the same conditions as in Example 1, but the time during which the insulated conductor passes the tube 17 is about 0.5 minutes. The degree of cross-linking in the polyethylene can be established and controlled and adjusted in the manner indicated in Example 1.

In an alternative method of determining the degree of cross-linking in the device according to FIG. 1, a preformed product is used in the form of a strip of polyethylene containing a cross-linking indicator. The strip is fed in along the conductor when entering the extrusion machine, as described in Example 1. The strip has the same composition as the compound which is to form the insulation, however, possibly without peroxide and antioxidant and apart from the fact that the compound forming the insulation does not contain any cross-linking indicator. Manufacture of the insulated conductor takes place in the same way as has been described previously. To establish the degree of cross-linking in the finished insulated conductor, a cross-section thereof is cut off, shown in FIG. 8, where the strip with the cross-linking indicator is designated 23. The color of the cross-linking indicator is then compared with a calibrated scale and any measures required for controlling the cross-linking reaction in the conductor insulation are thereafter taken.

EXAMPLE 6

An insulated cable conductor is manufactured in the manner indicated in Example 5, with the difference that instead of the cross-linking indicator mentioned there, there is used as cross-linking indicator the same amount of the previously mentioned compound with the trade name PV-Gelb GR from Hoechst, Casella.

EXAMPLE 7

An insulated cable conductor is manufactured in the manner indicated in Example 5 with the difference that, instead of the cross-linking indicator mentioned there, there is used as cross-linking indicator the same amount of the previously mentioned compound with the trade name Permanentrot TG 01 from Hoechst, Casella.

EXAMPLE 8

An insulated cable conductor is manufactured in the manner indicated in Example 5 with the difference that, instead of the cross-linking indicator mentioned there, there is used as cross-linking indicator the same amount of the previously mentioned compound with the trade name PV-Echt-Orange GRL from Hoechst, Casella.

The method and the composition according to the invention is suited for use when manufacturing all kinds of objects of all polymers which may be cross-linked with peroxide. Besides the particularly described example, insulations for cable conductors, there may be mentioned fillisters, cable sheaths, tubes, among other things tubes for heating, water and sanitation for high-temperature applications, hoses, gaskets, and so on.

I claim:

1. Method of manufacturing an object of cross-linked polymer by using a peroxide, which comprises forming a starting material containing a peroxide and a polymer material with the ability to undergo a cross-linking reaction in the presence of the peroxide into an object and cross-linking the starting material during at least part of the manufacturing process in the presence of a substance with the ability to undergo a colour change during the cross-linking reaction of the polymer material, so that a colour change of the substance is achieved wherein said substance is an aromatic compound containing at least one halogen atom and/or at least one heterocyclic ring, in which ring there is at least one nitrogen atom to which no hydrogen atom is linked.

2. Method according to claim 1, which comprises distributing the substance with the ability to undergo a colour change substantially uniformly in the starting material prior to forming.

3. Method according to claim 1, which comprises applying the substance with the ability to undergo a colour change in locally limited areas in the starting material in connection with the forming of the object.

4. Method according to claim 1, which comprises adding the substance with the ability to undergo a colour change to the starting material mixed with another polymer material.

5. Method according to claim 1, which comprises adding the substance with the ability to undergo a colour change to the starting material together with a dye without the ability to undergo a colour change during the cross-linking reaction of the polymer material.

6. Method according to claim 1, in which the aromatic compound contains a benzene ring with at least one halogen atom linked directly to it.

7. Method according to claim 6, in which the halogen atom is a chlorine atom.

8. Method according to claim 6 in which the substance with the ability to undergo a colour change is carbazole dioxazine violet

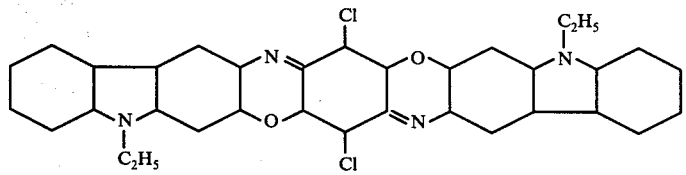

there is used as cross-linking indicator the same amount thioindigo Bordeaux

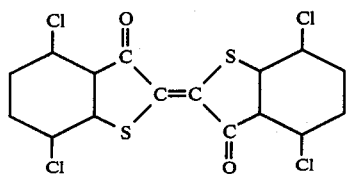

a compound with the formula

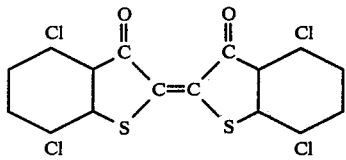

or a compound with the formula

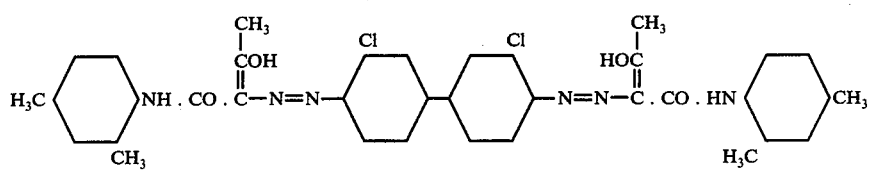

9. Method according to claim 1, in which the aromatic compound contains a heterocyclic 5- or 6-membered ring, which comprises at least one nitrogen atom to which no hydrogen atom is linked.

10. Method according to claim 1 in which the substance with the ability to undergo a colour change is a compound with the formula

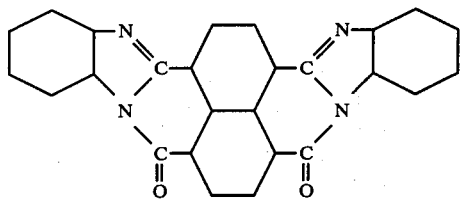

or a compound with the formula

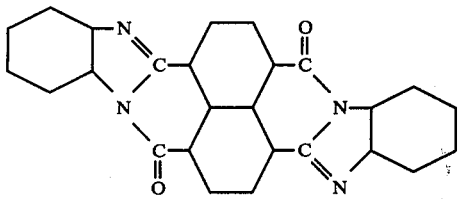

11. Method according to claim 5, in which the dye without the ability to undergo a colour change is titanium dioxide, a compound with the formula

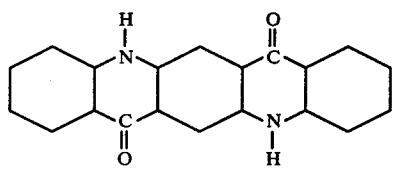

or copper phthalocyanine

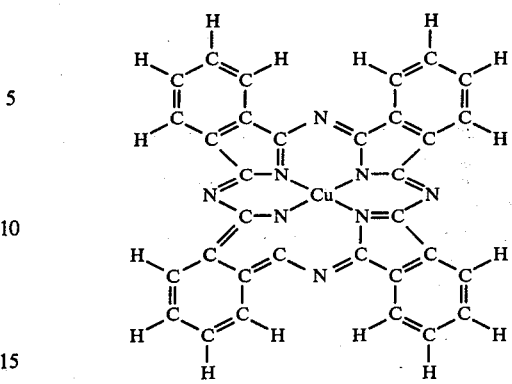

12. Method according to claim 1, in which the polymer material consists essentially of polyethylene, a copolymerisate of ethylene and propylene, a copolymerisate of ethylene and propylene with a dienmonomer, chloroprene, sulfochlorinated polyethylene or styrene-butadiene rubber.

13. Method according to claim 1, in which the peroxide consists essentially of di-α-cumyl peroxide, di-tert-butyl peroxide, di-(tert-butyl peroxi isopropylene) benzene, di-(tert-butylperoxi) trimethyl cyclohexane), or di-methyl-di(tert.butylperoxi) hexane.

14. Method according to claim 1, in which the object is formed by extrusion.

15. Method according to claim 1, in which the object is formed by injection moulding or compression moulding.

16. Method according to claim 14, in which the starting material is formed into insulation for a cable conductor.

17. Method according to claim 14, in which the starting material is formed into a cable sheath.

18. Cross-linkable composition containing a peroxide, a polymer material with the ability to undergo a cross-linking reaction in the presence of the peroxide, and a substance with the ability to undergo a colour change during the cross-linking reaction of the polymer material wherein said substance is an aromatic compound containing at least one halogen and/or at least one heterocyclic ring, in which there is at least one nitrogen atom to which one hydrogen atom is linked.

19. Cross-linkable composition according to claim 18, in which the substance with the ability to undergo a colour change is substantially uniformly distributed in the composition.

20. Cross-linkable composition according to claim 18, in which the substance with the ability to undergo a colour change is present in locally limited areas in the composition.

21. Cross-linkable composition according to claim 18, in which the substance with the ability to undergo a colour change is included in the composition as separate bodies containing also another polymer material.

22. Cross-linkable composition according to claim 18, in which the composition contains a dye without any ability to undergo a colour change during the cross-linking reaction of the polymer material.

23. Cross-linkable composition according to claim 18, in which the aromatic compound contains a benzene ring with at least one halogen atom directly linked thereto.

24. Cross-linkable composition according to claim 23, in which the halogen atom is a chlorine atom.

25. Cross-linkable composition according to claim 23 in which the substance with the ability to undergo a colour change: carbazole dioxazine violet

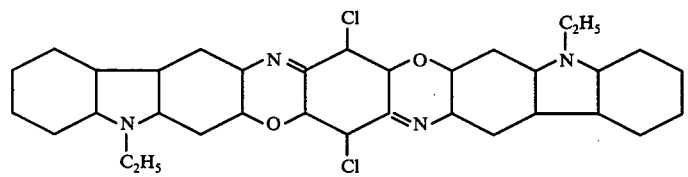

thioindigo Bordeaux

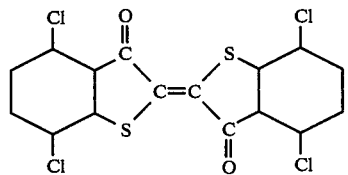

a compound with the formula

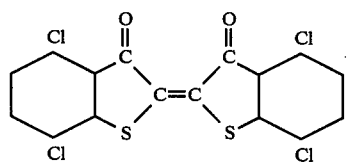

or a compound with the formula

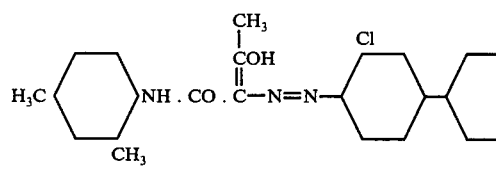

26. Cross-linkable composition according to claim 18, in which the aromatic compound contains a heterocyclic 5- or 6-membered ring, which comprises at least one nitrogen atom to which no hydrogen atom is linked.

27. Cross-linkable composition according to claim 18 in which the substance with the ability to undergo a colour change is a compound with the formula

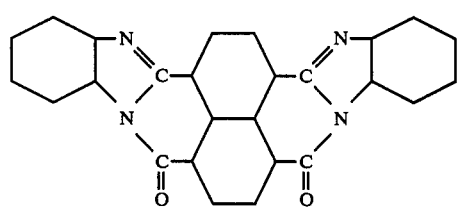

or a compound with the formula

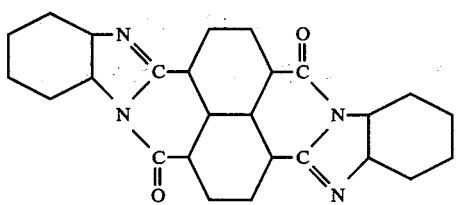

28. Cross-linkable composition according to claim 22, in which dye without the ability to undergo a colour change is titanium oxide, a compound with the formula

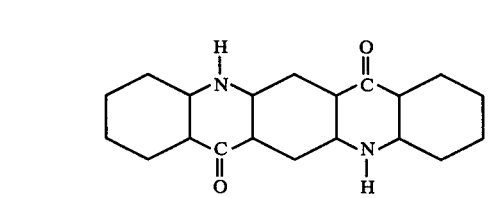

or copper phthalocyanine

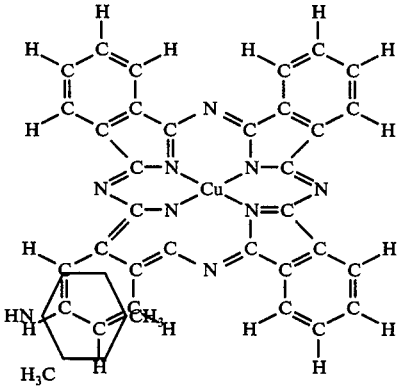

29. Cross-linkable composition according to claim 18, in which the polymer material in the composition consists essentially of polyethylene, a copolymerisate of ethylene and propylene, a copolymerisate of ethylene and propylene with a dienmonomer such as dicyclopentadiene, chloroprene, sulfochlorinated polyethylene or styrene-butadiene rubber.

30. Cross-linkable composition according to claim 18, in which the peroxide consists essentially of di-α-cumyl peroxide, di-tert-butyl peroxide, di-(tert-butyl peroxi isopropyl) benzene, di-(tert-butyl peroxi) trimethylcyclohexane or dimethyl-di(tert-butyl-peroxi) hexane.

31. Method according to claim 1, in which the substance with the ability to undergo a colour change is carbazole dioxazine violet.

32. Cross-linkable composition according to claim 18, in which the substance with the ability to undergo a colour change is carbazole dioxazine violet.

* * * * *